United States Patent [19]

Hart, Jr. et al.

[11] Patent Number: 5,418,881
[45] Date of Patent: May 23, 1995

[54] ARTICLE COMPRISING OPTICAL FIBER HAVING LOW POLARIZATION MODE DISPERSION, DUE TO PERMANENT SPIN

[75] Inventors: Arthur C. Hart, Jr., Chester; Richard G. Huff, Basking Ridge; Kenneth L. Walker, New Providence, all of N.J.

[73] Assignee: AT&T Corp., Murray Hill, N.J.

[21] Appl. No.: 317,409

[22] Filed: Oct. 3, 1994

Related U.S. Application Data

[60] Continuation of Ser. No. 164,525, Dec. 9, 1993, abandoned, which is a division of Ser. No. 924,278, Aug. 3, 1992, Pat. No. 5,298,047.

[51] Int. Cl.$^6$ .............................................. G02B 6/10
[52] U.S. Cl. .................................. 385/123; 385/111; 385/11; 65/432; 65/438
[58] Field of Search ............... 385/123, 100, 110, 111, 385/113, 11, 15; 65/3.11, 10.1, 438, 432, 435; 359/494, 498, 885; 57/6, 7, 9, 293; 264/1.5; 356/73.1, 364

[56] References Cited

U.S. PATENT DOCUMENTS

| | | | |
|---|---|---|---|
| 4,028,081 | 6/1977 | Marcatili | 65/2 |
| 4,154,049 | 5/1979 | King et al. | 385/100 X |
| 4,205,899 | 6/1980 | King et al. | 350/96.23 |
| 4,248,035 | 2/1981 | Skillen et al. | 385/100 X |
| 4,308,045 | 12/1981 | Miller | 65/3.11 |
| 4,341,442 | 7/1982 | Johnson | 350/96.30 |
| 4,427,717 | 1/1984 | Gauthier | 427/163 |
| 4,504,300 | 3/1985 | Gauthier et al. | 65/10.1 |
| 4,509,968 | 4/1985 | Arditty et al. | 65/10.1 |
| 4,556,314 | 12/1985 | Stone | 356/73.1 |
| 4,572,840 | 2/1986 | Gombert et al. | 427/36 |
| 4,606,605 | 8/1986 | Ashkin et al. | 350/96.31 |
| 4,884,859 | 12/1989 | Yamamoto et al. | 350/96.15 |
| 5,227,623 | 7/1993 | Heffner | 356/364 |

OTHER PUBLICATIONS

Patent Abstracts of Japan, vol. 13, No. 187 (C-592) 2 May 1989 and JP-A-01 014 126 (Hitachi Cable Ltd.) 18 Jan. 1989.
PCT Application: PCT/GB82/00200, filed Jul. 7, 1982, Publication No. WO 83/00232, published Jan. 20, 1983.
"Outer Diameter Measurement of Low Birefringence Optical Fibers by a New Resonant Backscatter Technique", by A. Ashkin et al., *Applied Optics*, 1 Jul. 1981, vol. 20, No. 13, pp. 2299–2303.
"Birefringence and Polarization Mode–Dispersion in Spun Single–Mode Fibers", by A. J. Barlow et al., *Applied Optics*, vol. 20, No. 17, Sep. 1, 1981, pp. 2962–2968.
"Preservation of Polarization in Single–Mode Fibers", by S. C. Rashleigh et al., *Laser Focus*, May 1983 issue, 6 pages.
"Origins and Control of Polarization Effects in Single–Mode Fibers", by S. C. Rashleigh, *Journal of Lightwave Technology*, vol. LT-1, No. 2, Jun. 1983, pp. 312–331.
"Internal Rotation of the Birefringence Axes in Polarization–Holding Fibers", by M. J. Marrone et al., *Optics Letters*, vol. 12, No. 1, Jan. 1987, pp. 60–62.
"Technique for Controlling the Internal Rotation of Principal Axes in the Fabrication of Birefringent Fibers", by C. G. Askins et al., *Journal of Lightwave Technology*, vol. 6, No. 9, Sep. 1988, pp. 1402–1405.
"Fabrication of Circularly Birefringent Single Mode Fibers", by S.C.Rashleigh, Navy Technical Disclosure Bulletin, vol. 5, No. 12 (1980), 8 pages.
European Search Repot, The Hague, Sep. 29, 1993, Examiner J. G. Stroud.

*Primary Examiner*—Frank Gonzalez
*Assistant Examiner*—Phan Thi Heartney Palmer
*Attorney, Agent, or Firm*—Eugen E. Pacher

[57] ABSTRACT

The presence of (typically unintended) birefringence in single mode optical fiber can severely limit the usefulness of the fiber for, e.g., high bit rate or analog optical fiber communication systems, due to the resulting polarization mode dispersion (PMD). It has now been discovered that PMD can be substantially reduced if, during drawing of the fiber, a torque is applied to the fiber such that a "spin" is impressed on the fiber. Desirably the torque is applied such that the spin impressed on the fiber does not have constant spatial frequency, e.g., has alternately clockwise and counterclockwise helicity. At least a portion of optical fiber according to the invention has spin alternately clockwise and counterclockwise.

4 Claims, 3 Drawing Sheets

FIBER COOLING DISTANCE

TO TAKE - UP SPOOL

ARTICLE COMPRISING OPTICAL FIBER HAVING LOW POLARIZATION MODE DISPERSION, DUE TO PERMANENT SPIN

This application is a continuation of application Ser. No. 08/164,525, filed on Dec. 9, 1993, now abandoned, which was a divisional application under 37 CFR 1.60, Ser. No. 07/924,278, filed Aug. 3, 1992, now U.S. Pat. No. 5,298,047.

FIELD OF THE INVENTION

This invention pertains to optical fibers, in particular, to single mode optical fiber having relatively low polarization mode dispersion (PMD). It also pertains to communication systems that comprise such fiber, and to methods of making such fiber.

BACKGROUND OF THE INVENTION

An ideal circularly symmetric "single mode" optical fiber can support two independent, degenerate modes of orthogonal polarization. Either one of these constitutes the fundamental $HE_{11}$ mode. In general, the electric field of light propagating along the fiber is a linear superposition of these two polarization eigenmodes.

In practical single mode fiber, various imperfections such as asymmetrical lateral stress and a non-circular core typically break the circular symmetry of the ideal fiber and lift the degeneracy of these two polarization modes. The two modes then propagate with different phase velocities, and this difference between their effective refractive indices is called birefringence.

Fiber birefringence can result from either a geometrical deformation or from various elasto-optic, magneto-optic or electro-optic index changes. In so-called polarization-preserving fibers asymmetry is deliberately introduced into the fiber. However, in ordinary (non-polarization-preserving) fibers the birefringence mechanisms act on the fiber in substantially unpredictable manner. Thus, the polarization state of the guided light will typically evolve through a pseudorandom sequence of states along the fiber, with the polarization state at the fiber output typically being both unpredictable and unstable. On average, a given polarization state in a given fiber is reproduced after a certain length $L_p$, the polarization "beat" length associated with the given fiber.

The presence of birefringence in conventional single mode fiber results in signal dispersion (so-called polarization mode dispersion or PMD) and thus typically is undesirable, especially for applications that involve high bit rates or analog transmission (e.g., for optical fiber analog CATV systems).

It is known that fiber having low PMD can be produced by rapidly spinning the preform while pulling the fiber from the preform. The prior art teaches that this results in periodically interchanged fast and slow birefringence axes along the fiber, which can lead to very low net birefringence due to piecemeal compensation of the relative phase delay between the polarization eigenmodes, provided the spin pitch is much less than the "un-spun" fiber beat length. See, for instance, A. Ashkin et al., *Applied Optics*, Vol. 20(13), p. 2299; A. J. Barlow et al., *Applied Optics*, Vol. 20(17), p. 2962; and S. C. Rashleigh, Laser Focus, May 1983.

It is primarily the prior art requirement that the spin pitch be much less than the "unspun" $L_p$ which makes the prior art technique substantially unsuitable for current commercial fiber production. For instance, assuming that the unspun $L_p$ is about 1 m and the draw speed is 10 m/seconds, then the preform has to be spun at 6000 rpm in order to yield a spin pitch that is 1/10th of the unspun $L_p$. This is typically not practical in commercial fiber production.

In view of the commercial significance of low birefringence optical fiber, it would be highly desirable to have available a technique for producing such fiber that is compatible with current commercial practice, e.g., that is usable even at the high draw speeds that are typically used now. This application discloses such a technique.

THE INVENTION

Figure 1:
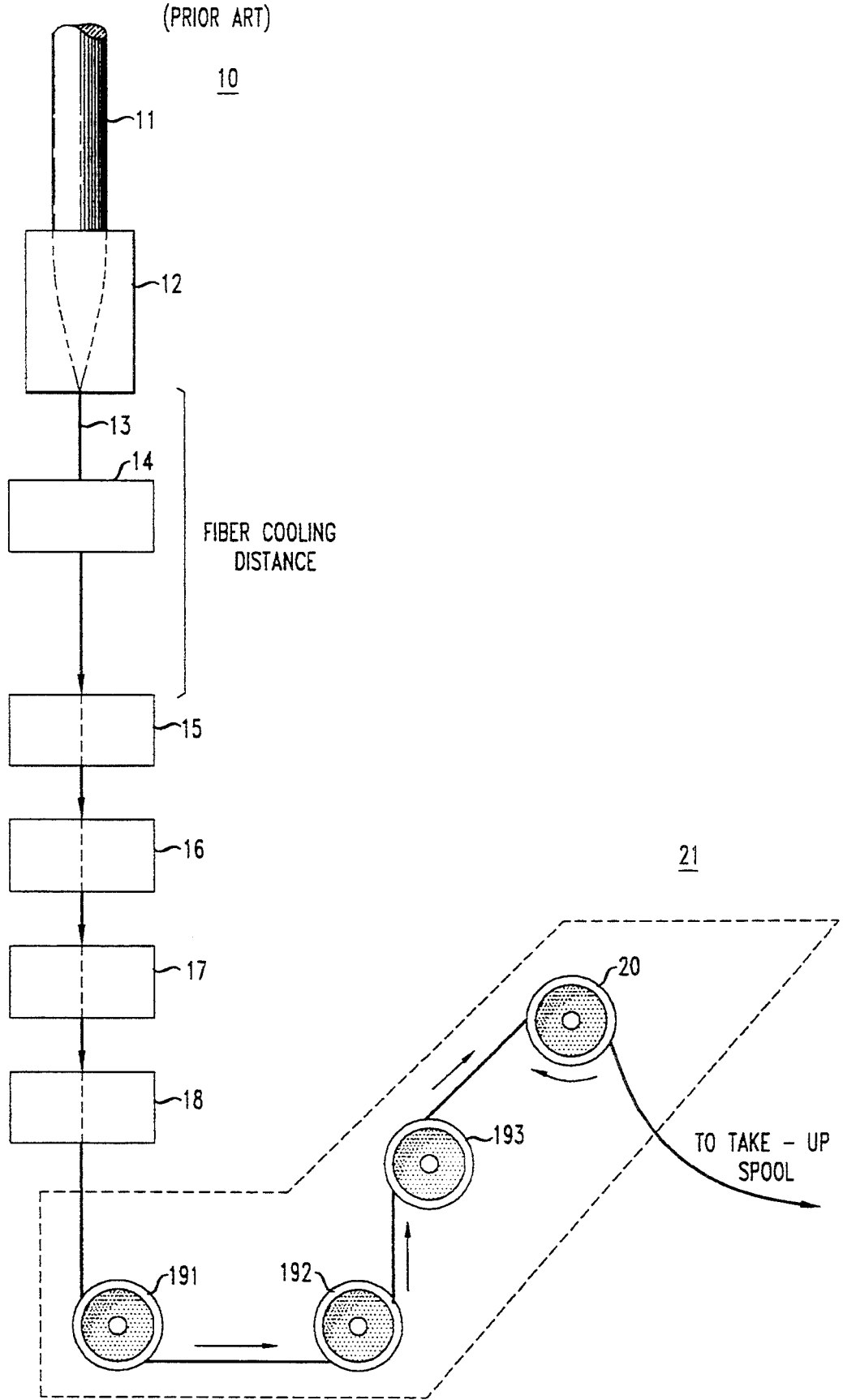
FIG. 1 schematically depicts exemplary prior art fiber draw apparatus.

Broadly speaking, the invention is embodied in a novel and convenient method of making optical fiber, typically single mode fiber, that can be used to produce fiber having low PMD, exemplarily less than 0.5 ps/km$^{\frac{1}{2}}$. It is also embodied in a novel type of low PMD fiber, and in articles (e.g., an optical fiber communication system) that comprise such fiber.

More specifically, the inventive method comprises providing a conventional optical fiber preform, heating at least a portion of the preform to a conventional draw temperature, and drawing optical fiber from the heated preform in such a way that a spin is impressed on the fiber. Significantly, a torque is applied to the fiber such that the fiber is caused to twist around its longitudinal axis, with a resulting torsional deformation of the fiber material in the hot zone.

A spin is "impressed" on the fiber herein if fiber material in the hot zone is caused to be torsionally deformed, with that deformation being frozen into the fiber, such that the fiber exhibits a permanent "spin", i.e., a permanent torsional deformation. The existence of such a frozen-in spin can be readily ascertained, e.g., by microscopic examination of the fiber to determine rotation of core ovality or eccentricity, or by means of a traveling magneto-optic modulator, as used by M. J. Marrone et at., *Optics Letters*, Vol. 12(1), p. 60. Associated with such a frozen-in spin is a pitch, the spin repeat distance along the fiber.

As will be readily appreciated by those skilled in the art, the prior art method of spinning the preform results in a spin of essentially constant pitch. It is known that small twists of the symmetry axes can occur during the drawing process such that even conventional single-mode fibers exhibit a variation in the optical polarization along the fiber. See, for instance, the above cited Marrone et al. paper. However, we know of no case of prior art fiber with unintended spin whose spin had a spatial frequency in excess of 4 spins/meter. See, for instance, M. J. Marrone et al., op. cit., Table 1. Fiber having such low spin typically does not exhibit commercially significant reduction in PMD. Thus, fiber according to the invention comprises a portion or portions having spin spatial frequency in excess of 4 spins/meter, preferably in excess of 10 or even 20 spins/meter.

In currently preferred embodiments of the invention, the torque is applied intermittently to the fiber, whereby the spin impressed on the fiber has a pitch that is not constant over substantial lengths of fiber, e.g., is not constant over the beat length $L_p$. We currently believe that non-constant pitch can have advantages over constant pitch, since low pitch can also couple the two polarization modes, provided the pitch is precisely matched with the fiber birefringence spatial frequency. See, for instance, S.C. Rashleigh, J. of Lightwave Technology, Vol. LT-1(2), pp. 312–331, especially p. 320, where it is stated that, "... regardless of the actual distribution f(z) of the birefringence perturbations, only the one spectral component with frequency $\beta_i$ can couple the two polarization eigenmodes. All other spectral components do not efficiently couple the modes". The parameter $\beta_i$ is the intrinsic birefringence of the fiber, and $F(\beta_i)$ is the Fourier transform of f(z). Since the perturbation f(z) is essentially random, it is clear that a constant pitch spin will typically not result in efficient mode coupling. On the other hand, non-constant pitch spin, especially spin that has alternately positive and negative helicity, is likely to contain spatial components that produce efficient coupling. We currently believe that strong coupling can be obtained with spin of varying spatial frequency that comprises, in addition to regions of relatively high spin spatial frequency, regions of relatively low spin spatial frequency. This is, for instance, the case if the spin alternates between positive and negative helicity.

The invention is also embodied in optical fiber (exemplarily $SiO_2$-based fiber comprising a core and a cladding, with the former having larger effective refractive index than the cladding material that surrounds the core) that is produced by the inventive method. It is also embodied in an article (e.g., an optical fiber communication system that comprises a source of an optical signal, means for detecting an optical signal, and an optical fiber according to the invention signal-transmissively connecting the detector means and the source. More specifically, a spin is impressed on the fiber, with the spin not being constant along the fiber, and with at least a portion of the fiber having a spatial spin frequency in excess of 4 spins/meter.

FIG. 1 schematically depicts conventional (prior art) drawing apparatus 10. Fiber preform 11 is slowly fed (by means of a feed mechanism that is not shown) into furnace 12, where fiber 13 is drawn from the necked down portion of the preform. The bare fiber passes through diameter monitor 14 into coating applicator 15, wherein the polymer coating (frequently comprising an inner and an outer coating) is applied to the, by now relatively cool, bare fiber. After passing through coating concentricity monitor 16 the fiber passes through curing station 17. Exemplarily 17 comprises UV lamps. Downstream from 17 is coating diameter monitor 18, followed by guide means (e.g., rollers 191, 192, 193) and drive means (e.g., pulling capstan 20) in region 21. It will be noted that guide roller 191 is the first contact point of the fiber with a solid. At this point the fiber is already protected by a cured polymer coating. It will also be noted that the draw force is provided by capstan 20, and that the rotational speed of 20 determines the draw speed, which exemplarily can be as high as 20 m/second. From 20 the fiber typically is lead to (independently driven) take-up means, e.g., a take-up spool. Those skilled in the art will recognize that FIG. 1 shows several optional features (e.g., 14, 16, 18), and does not show all possible features (e.g., a hermetic coating chamber between 12 and 15). However, FIG. 10 exemplifies currently used conventional drawing apparatus.

In the prior an apparatus of FIG. 1 the fiber essentially moves in a single plane at least between its point of origin in the furnace and the capstan, and no twist is intentionally impressed on the fiber. See FIG. 2, which is a schematic top view of portion 21 of the apparatus of FIG. 1.

According to the invention, a torque is applied to the fiber such that a spin is impressed on the fiber. Although in principle the torque could be applied at any downstream point (prior to take-up) at which the fiber has cooled sufficiently to be contacted, it is generally not desirable to contact the bare fiber. Thus, the torque advantageously is applied at a point downstream from curing station 17, typically at an appropriate point in region 21. It is currently most preferred to apply the torque by means of the first guide roller.

We have discovered that an intermittent torque can be applied to the fiber, such that a twist with non-constant pitch is impressed on the fiber. This can, for instance, be accomplished by changing the orientation of guide roller 1911 of FIG. 3, exemplarily by canting the roller by an angle $\theta$ around a direction parallel to the draw tower axis. Canting roller 1911 as indicated causes the fiber to oscillate back and forth on the roller, in response to lateral forces that automatically arise in this arrangement. More specifically, the lateral forces translate into a torque on the fiber, which causes the fiber to roll laterally on roller 1911, thereby moving the fiber out of the plane defined by the fiber in the prior an (un-canted) apparatus. It will be appreciated that the lateral roll is superimposed on the conventional draw motion. The lateral motion of the fiber is believed to give rise to a restoring force that increases with increasing lateral displacement of the fiber, causing the fiber to jump back (substantially, but not necessarily exactly) into the plane, only to immediately begin another sidewise roll. This non-symmetrical back-and-forth motion is indicated by the double-headed arrow adjacent to roller 1911 in FIG. 3. The angular rotation speed of the fiber during the lateral roll is, inter alia, a function of the cant angle $\theta$. Thus, the pitch of the spin impressed on the fiber is also a function of $\theta$. For instance, particular draw apparatus used by us yielded average pitches of 14 and 7 cm for $\theta = 7$ and 15°, respectively. It will be appreciated that these values are exemplary only, since the pitch will depend, inter alia, on the configuration and height of the draw tower, the draw speed, the draw tension and the coating viscosity.

Those skilled in the art will recognize that the described exemplary method not only impresses a spin on the fiber but also introduces a substantially equal and opposite (generally elastic) twist into the taken-up fiber. Although such fiber may be acceptable for some purposes (e.g., for sensor purposes that require only a relatively short length of fiber), it will generally be desirable to remove (or prevent the introduction of) the unwanted elastic twist. The elastic twist can, for instance, be removed by appropriate respooling. However, it is preferable to substantially prevent introduction of the elastic twist. This can be accomplished by alternately imposing a clockwise and a counterclockwise torque on the fiber, exemplarily as described below.

Figure 4:
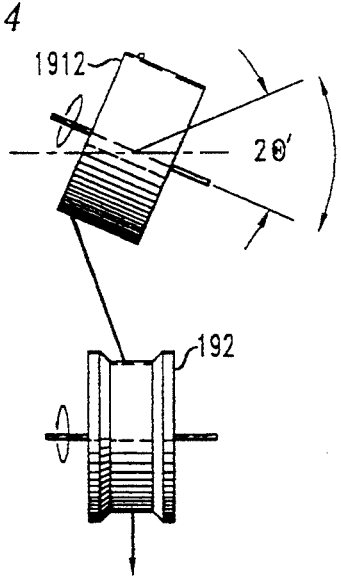
Figure 5:
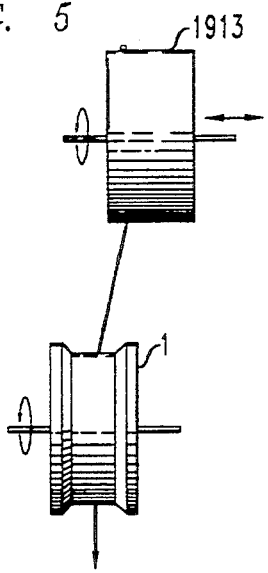

Causing the guide roller 1912 of FIG. 4 to oscillate about an axis that is parallel to the fiber draw direction (which is typically the same as the draw tower axis) alternately impresses positive and negative spin on the fiber. Furthermore, the resulting positive and negative elastic twists on the fiber substantially cancel, such that the fiber on the take-up spool is substantially free of torsional elastic strain. Guide roller 1912 of FIG. 4 can be caused to oscillate back and forth by any appropriate means, e.g., by eccentric drive means (not shown). An alternate arrangement is schematically shown in FIG. 5, wherein guide roller 1913 is caused to move back and forth axially, by appropriate conventional means that are not shown, resulting in alternate application of clockwise and counterclockwise torque on the fiber.

Figure 2:
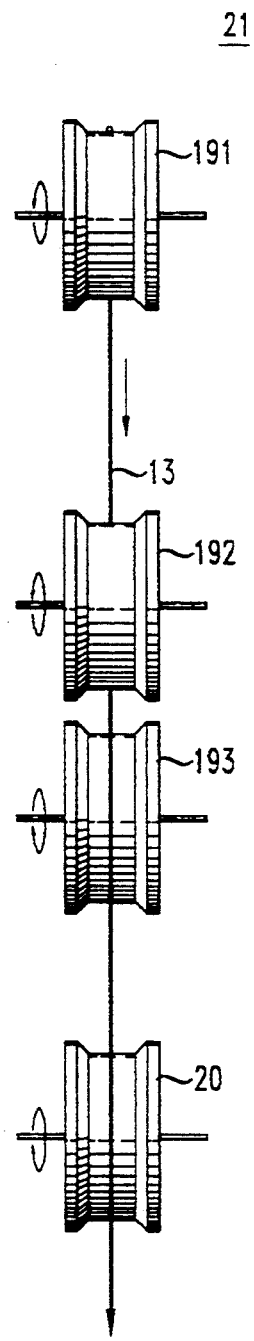
FIG. 2 shows, schematically and in top view, the guide portion of the apparatus of FIG. 1.
Figure 3:
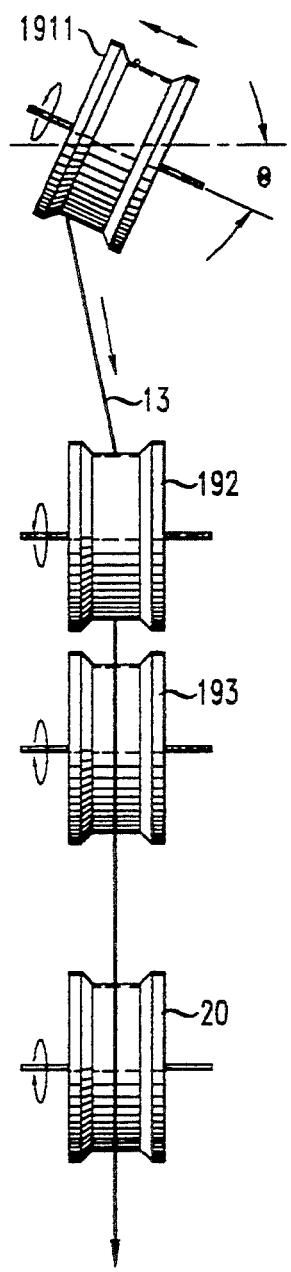
FIGS. 3–5 depict, also schematically and in top view, exemplary guide portions that can be used to practice the invention.

Those skilled in the art will recognize that the guide and drive means 21 of FIG. 1 can take many forms. For instance, sheaves (as shown in FIGS. 1–3) may be used, or ungrooved rollers may be used, or sheaves and ungrooved rollers may be used in combination (exemplarily as shown in FIGS. 4 and 5). All appropriate guide and drive means are contemplated, as are all appropriate means for applying an appropriate torque to the fiber.

Figure 6:
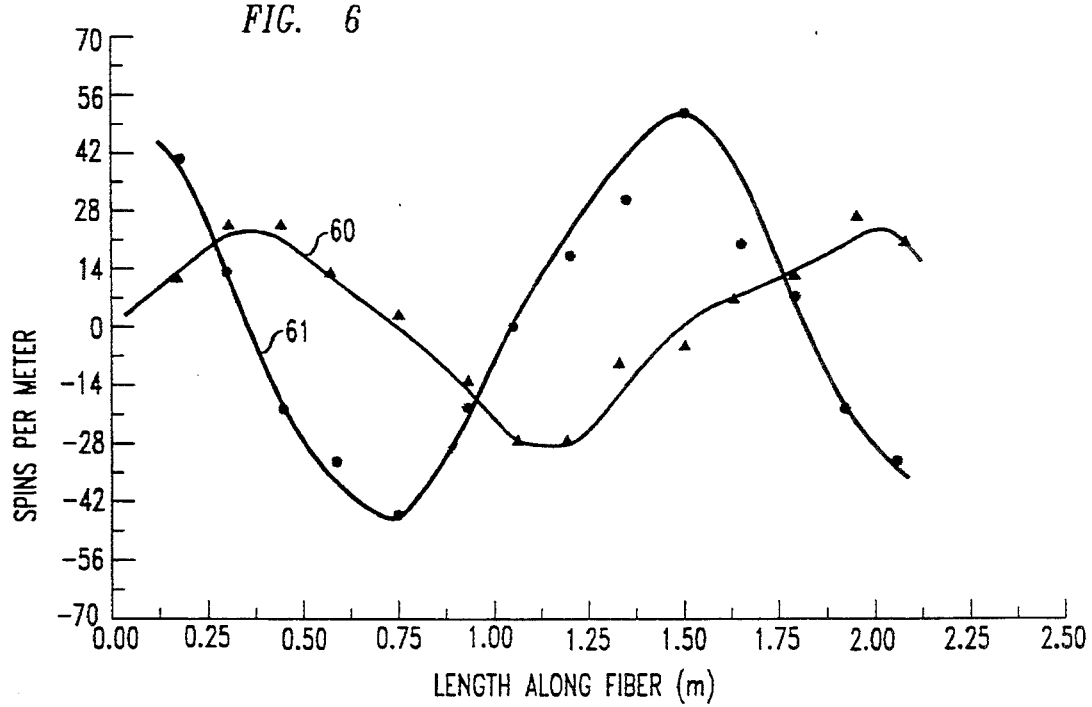
FIG. 6 shows exemplary data on spin vs. distance along the fiber, for fiber according to the invention.

FIG. 6 shows exemplary experimental data, namely, the spin spatial frequency (in spins/m) as a function of distance along the fiber. Curve 60 was obtained from a single mode fiber which was drawn at 1.5 m/second, with 60 cycles/minute of the oscillating guide roller 1912 of FIG. 4), and curve 61 from an otherwise identical single mode fiber which was drawn at 3 m/second, with 106 cycles/minute of roller 1912. As can be seen from FIG. 6, each of the fibers contains portions whose spin spatial frequency is far in excess of 4 spins/m (even in excess of 20 spins/m), and in each of the fibers the spin is non-constant, even having clockwise and counterclockwise helicity, resulting in substantial likelihood that the spin comprises a component that is effective in coupling the two polarization modes.

Figure 7:
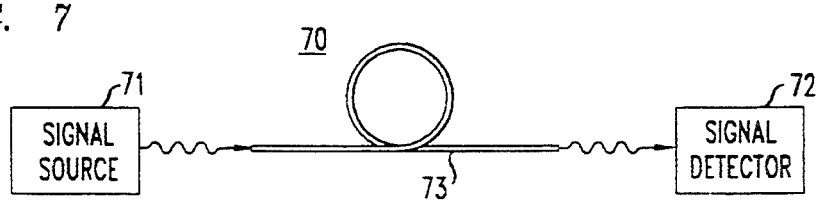
FIG. 7 schematically depicts an exemplary optical communication system according to the invention.

Those skilled in the art will appreciate that the pitch of the spin impressed on fiber drawn in apparatus of the type shown in FIG. 4 depends, inter alia, on the oscillation amplitude $2\theta'$ and the oscillation frequency. For instance, in a particular fiber draw apparatus according to the invention $\theta'$ was about 15°, and the oscillation frequency was about 106 cycles/minute. These values are exemplary only, and those skilled in the art will, aided by the teachings herein, be able to not only adapt their draw apparatus to practice the invention but also to select draw parameters that are suitable for their particular apparatus. FIG. 7 shows an exemplary optical communication system 70 according to the invention wherein numerals 71–73 refer, respectively, to an optical signal source, an optical signal detector, and optical fiber that signal transmissively connects source and detector.

We claim:

1. An article comprising optical communication fiber with a spin impressed on the fiber; CHARACTERIZED IN THAT the fiber is single mode optical fiber; and in at least a portion of the fiber the spin impressed on the fiber is alternately clockwise and counterclockwise, with a spin repeat distance of at most 20 m.

2. Article according to claim 1, wherein said single mode optical fiber has a polarization mode dispersion (PMD), with the PMD of the fiber being less than 0.5 ps/km$^{\frac{1}{2}}$.

3. Article according to claim 2, wherein the article is an optical communication system that comprises an optical signal source a length of optical fiber comprising said single mode optical fiber and an optical signal detector, with said length optical fiber signal-transmissively connecting said source and said detector.

4. Article according to claim 1, wherein the repeat distance is at most 13.2 m.

* * * * *